US012590695B2

(12) United States Patent
Duong et al.

(10) Patent No.: US 12,590,695 B2
(45) Date of Patent: Mar. 31, 2026

(54) SYSTEMS AND METHODS FOR LIGHTING FIXTURES

(71) Applicant: LIBRA DESIGN LLC, Bee Cave, TX (US)

(72) Inventors: Dung Duong, Bee Cave, TX (US); Travis Williams, West Dover, VT (US)

(73) Assignee: LIBRA DESIGN LLC, Bee Cave, TX (US)

( * ) Notice: Subject to any disclaimer, the term of this patent is extended or adjusted under 35 U.S.C. 154(b) by 0 days.

(21) Appl. No.: 19/068,218

(22) Filed: Mar. 3, 2025

(65) Prior Publication Data

US 2025/0320994 A1 Oct. 16, 2025

Related U.S. Application Data

(60) Provisional application No. 63/634,227, filed on Apr. 15, 2024.

(51) Int. Cl.

| | |
|---|---|
| ***F21V 29/70*** | (2015.01) |
| ***F21S 4/28*** | (2016.01) |
| ***F21V 7/04*** | (2006.01) |
| ***F21V 15/015*** | (2006.01) |
| ***F21V 19/00*** | (2006.01) |
| ***F21V 29/503*** | (2015.01) |

(52) U.S. Cl.

CPC ................ *F21V 29/70* (2015.01); *F21S 4/28* (2016.01); *F21V 7/04* (2013.01); *F21V 15/015* (2013.01); *F21V 19/0015* (2013.01); *F21V 29/503* (2015.01)

(58) Field of Classification Search

CPC .......... F21V 29/70; F21V 29/503; F21V 7/04; F21S 4/28

See application file for complete search history.

(56) References Cited

U.S. PATENT DOCUMENTS

| | | | | |
|---|---|---|---|---|
| 10,473,298 | B1 * | 11/2019 | Gomez Martinez | F21V 19/0045 |
| 2012/0155095 | A1 * | 6/2012 | Ryan, Jr. | F21V 29/89 165/185 |
| 2014/0268721 | A1 * | 9/2014 | Durkee | F21V 5/08 362/218 |
| 2016/0238231 | A1 * | 8/2016 | Hayes | F21V 23/005 |
| 2017/0219200 | A1 * | 8/2017 | Nolan | F21V 29/75 |
| 2018/0306387 | A1 * | 10/2018 | Rieder | F21K 9/275 |
| 2023/0133955 | A1 * | 5/2023 | Duong | F21V 29/713 362/294 |
| 2024/0142098 | A1 * | 5/2024 | Chen | F21V 29/83 |

* cited by examiner

*Primary Examiner* — Christopher E Dunay

(74) *Attorney, Agent, or Firm* — Pierson IP, PLLC

(57) ABSTRACT

A light fixture that utilize multiple sheets of MCPCB for reduced costs, weight, and thermal, mechanical, and/or optical controls. In other embodiments, a heat sink may be formed by extruding a block of material to form a heat sink that utilizes a venturi and chimney effect, which may include attached MCPCB. Specific embodiments may utilize a plurality of MCPCB sheets or other pliable materials, which may be mirrored over a central axis or an extruded heat sink to create an open upper surface with a chimney effect

8 Claims, 6 Drawing Sheets

SYSTEMS AND METHODS FOR LIGHTING FIXTURES

BACKGROUND INFORMATION

Field of the Disclosure

Examples of the present disclosure are related to systems and methods for lighting fixtures. More particularly, embodiments disclose lighting fixtures utilizing bends and a chimney effect in a heat sink comprised of metal-core PCB (MCPCB) for thermal, mechanical, and/or optical controls.

Background

Controlled environment agriculture, especially supplemental greenhouse lighting is becoming more prevalent in the US and around the world. Greenhouse farming relies on light fixtures to provide supplemental light to their crop during days/months where the required daily light integral (DLI) is not met (cloudy/rainy days, winter times) to achieve optimal plant quality and yields. Properly designed and deployed light fixtures uniformly distribute radiant flux over the plant canopy, while ensuring the heat from light sources is removed via effective thermal management for efficient operation and product longevity. The light fixtures' price and efficacy respectively impact the capital and operational expenses associated with greenhouse farming, while the fixtures' weight and size respectively impact the total load requirement by the structural truss and the reduction of ambient DLI caused by shading due to the lighting equipment itself.

Operating higher-powered lights is more costly than utilizing free sunlight in greenhouses or field gardens. To overcome these costs, greenhouse farming must have increased yields, shorter growth cycles, more consistent products, less water usage, reduced farm-to-plate timeframe, higher nutrient content, and other tangible advantages.

Although light-emitting diodes (LEDs) used in greenhouse farming are more efficient than traditional higher-powered lights, their manufacturing costs are also higher. Additionally, their performance is negatively impacted by thermal rise. The thermal rise requires the light fixtures to dissipate heat more efficiently. This generated heat causes issues such as decreased longevity and lower fixture efficacy. To circumvent the requirements to dissipate the heat, some manufacturers have built complex LED fixtures. This has led to conventional LED fixtures being coupled to heat sinks.

Conventional LED fixtures utilize LEDs that are positioned on a printed circuit board. PCB substrates may be made of different materials such as FR4, Aluminum, copper, etc. In most applications, an insulative substrate is necessary such as FR4. In higher-powered applications, a highly thermally conductive substrate is desired. For LEDs, thermal dissipation is paramount and therefore Aluminum substrates are often utilized. When metal is used as the substrate, the term metal core printed circuit board is used or more commonly MCPCB.

Conventionally, a linear MCPCB is coupled to the heatsink to dissipate generated heat, whereas the linear heatsink may include fins to dissipate heat. However, the fins may act as heat blocks and prevent air from reaching the upper surface. Thus, linear heatsinks with fins may lead to inefficient thermal transfer or increased thermal resistance between the heat source (LEDs) and the environment. Moreover, the process of affixing the LEDs to the MCPCB and then coupling the MCPCB to the heat sink requires time and resources. This can be an arduous, time-consuming, and costly task.

Accordingly, needs exist for more effective and efficient systems and methods for heatsinks multiple sheets of MCPCB, wherein the multiple sheets include at least two bends, aesthetic, thermal controls, and/or optical controls.

SUMMARY

Embodiments disclosed herein describe systems and methods for a light fixture that utilize multiple sheets of MCPCB for reduced costs, weight, and thermal, mechanical, and/or optical controls. In other embodiments, a heat sink may be formed by extruding a unitary block of material to form a heat sink that utilizes a venturi and chimney effect, which may include an attached MCPCB. In embodiments, the light fixture may not utilize an external or additional heat sink other than the MCPCB, which may not be further processed, etched, extruded, etc. This may drastically reduce the amount of resources required to move heated air. Specific embodiments may utilize a plurality of MCPCB sheets or other pliable materials, which may be mirrored over a central axis of the MCPCB to create an open upper surface with a chimney effect. The multiple sheets may be coupled together via endcaps positioned on a proximal end of the light fixture or coupled to the extruded heat sink and a distal end of the heat sink.

In embodiments, a substrate, such as an MCPCB sheet, may be directly populated with electronic components, such as LEDs, connectors, fuses, etc. The MCPCB sheet may then be coated for protection. The MCPCB sheet may be formed of copper, 3003 AL, 5052 AL, and/or other desired metals, and may have a thickness of approximately 0.75 mm to 1.75 mm. In implementations, the preferred MCPCB may not be formed of a metal with very low emissivity. To increase the emissivity of the MCPCB sheet, the sheet may be anodized, may have a solder mask that yields higher emissivity than anodized aluminum, and/or has a painted surface that yields higher emissivity than anodized aluminum.

Row(s) of LEDs may be positioned from the first end to the second end of the MCPCB sheet, which may extend along the longitudinal axis of the MCPCB sheet. The rows of LEDs may be symmetrically or asymmetrically spaced from the central axis of the MCPCB sheet. Asymmetrical implementations of the positioning of the LEDs may allow for even and symmetrical heat transfer, distribution, etc. from the LEDs, and/or allow for desired optical controls.

In embodiments, the substrate sheets may include multiple bends, wherein the first bend may be configured to control airflow towards a central axis of the heat sink, and a second bend may be configured to create a vertical passageway to control airflow away from the upper surface of the heat sink while also increasing the overall surface area of the heat sink. In embodiments, the first bend may be in a first direction at a first angle, while the second bend may be in a second direction at a second angle. The first direction and the second direction may be opposite directions, wherein the first bend may be utilized to decrease a width across the heat sink, whereas the second direction may be a right angle configured to maintain a width across the heat sink. In embodiments, the first bend may have an interior angle greater than 90 degrees, and the second bend may have a 270-degree interior angle and a 90-degree external angle.

The multiple bends in the multiple substrate sheets create a venturi effect, and chimney effect to remove heated air, while also maximizing radiation surface area. The bends in the MCPCB may extend from the first end to the second end of the MCPCB panel. The bends may be configured to add rigidity and/or mechanical strength, add form for aesthesis, and allow for thermal and optical controls, such as being a diffuse/specular reflector.

Other embodiments may include an integrated reflector. The integrated reflector may include substrate sheets with a first bend in the first direction, a second bend in the second direction, and an overhang. The differences in directionality between the first bend and second bend may create a choke point for airflow between the substrate sheets, and the overhang may create a reflector for light sources positioned between the first bend and the second bend.

In further embodiments, a heatsink may be extruded, and then the MCPCB may be attached to the heatsink.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions, or rearrangements may be made within the scope of the invention, and the invention includes all such substitutions, modifications, additions, or rearrangements.

BRIEF DESCRIPTION OF THE DRAWINGS

Non-limiting and non-exhaustive embodiments of the present invention are described concerning the following figures, wherein reference numerals refer to like parts throughout the various views unless otherwise specified.

Figure 1:
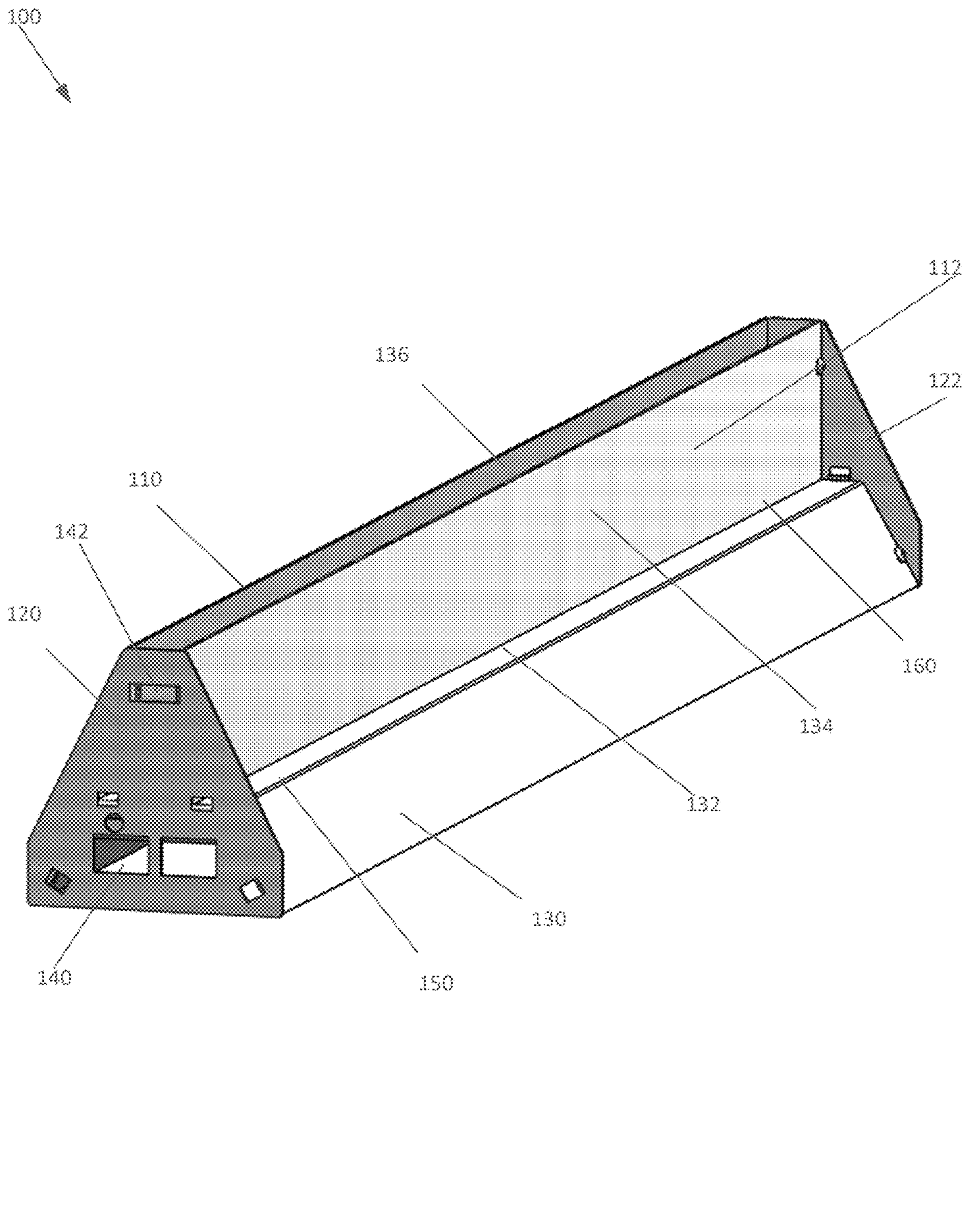
FIG. 1 depicts a heat sink system, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted to facilitate a less obstructed view of these various embodiments of the present disclosure.

DETAILED DESCRIPTION

In the following description, numerous specific details are outlined to provide a thorough understanding of the present embodiments. It will be apparent, however, to one having ordinary skill in the art that the specific detail need not be employed to practice the present embodiments. In other instances, well-known materials or methods have not been described in detail to avoid obscuring the present embodiments.

FIG. 1 depicts a heat sink system 100, according to an embodiment. System 100 may be configured to utilize bends in an MCPCB lighting fixture for thermal, mechanical, and optical controls. System 100 may include MCPCB sheets 110, 112 and end caps 120, 122.

MCPCB sheets 110, 112 may be formed of any metal, including copper, 3003 AL, 5052 AL, and/or other desired metals. In other embodiments, Heat sink 100 or another heatsink may be formed by extruding a block of metal or other materials into the corresponding shapes of MCPCB sheets 110, 112, or any other desired shape. Subsequently, the MCPCB sheets 110, 112 may be attached to the extruded heatsink. In specific implementations, MCPCB sheets 110, 112 may be formed of a metal or substrate with a very low emissivity. However, such a system would be much larger than a system with a high emissivity platform. To increase the emissivity of the MCPCB sheets 110, 112, MCPCB sheets 110, 112 may be anodized, may have a solder mask that yields higher emissivity than anodized aluminum, and/or have a painted surface that yields higher emissivity than anodized aluminum. MCPCB sheets 110, 112 may have a longer longitudinal axis than a lateral axis. MCPCB sheets 110, 112 may have a thickness that is based on the thermal properties generated by the light sources 120. In embodiments, MCPCB sheets 110, 112 may be symmetrically similar, and be mirrored in shape over a central axis of heat sink system 100. Utilizing multiple MCPCB sheets 110, 112 may allow for a vertical, and lateral, channel to be created between the MCPCB sheets 110, 112 that have open top and bottom surfaces. To this end, airflow may not only be controlled around the heat sink 100 but through the passageway through the two MCPCB sheets 110, 112.

MCPCB sheets 110, 112 may include a first section 130, a second section 132, and a third section 134. In embodiments, the first section 130 and second section 132 may be separated by the first bend 150, and the second section 132 and third section 134 may be separated by the second bend 160.

Bends 150, 160 may be positioned from the proximal end to the distal end of a corresponding MCPCB sheet 110. Bends 150, 160 may be configured to add rigidity and/or mechanical strength to heat sink 100, add form for aesthetics, operate as a heat sink to guide the flow of air, and allow for optical controls.

First section 130 of heat sink 100 may be angled surfaces that are configured to control the airflow of heat generated by light sources. Specifically, first section 130 may be angled to control airflow around heat sink 100, and control airflow between pairs of first section 130. First section 130 may extend from a lower surface of heat sink 100 to first bend 150. In embodiments, a width of first section 130 may be substantially similar to the overall height of the heat sink 100. In further embodiments, a width across heat sink 100 may be substantially similar to a height of heat sink 100.

Bend 150 may be positioned at an angle that is downward and away from the central axis of MCPCB sheet 110. Accordingly, a distance across a lateral axis across pairs of first sections 130 of heat sink 100 may decrease from the lower surface of first sections 130 to second sections 132. Accordingly, a distance across a lateral axis across pairs of first sections 130 of heat sink 100 may decrease from the lower surface of first sections 130 to second sections 132. By angling bends 150 away from the central axis, the thermal performance of system 100 may be increased. More specifically, air that is heated by the light sources (and other electronics) under MCPCB sheet 110, may travel toward the lower distal ends of bends 150, around the distal ends of bends 150, and upwards toward the central axis of system 100. The air may then travel through a chimney or vertical stack positioned between MCPCB sheets 110, 112.

Second sections 132 of MCPCB sheets 110, 112 may be positioned between first section 130 and third section 134 of MCPCB sheets 110, 112. Second section 132 may be configured to extend perpendicular to a central axis of MCPCB sheet 110 and decrease the length of the lateral axis of heat sink 100 between first bend 150 and second bend 160. This size reduction may allow for a venturi effect between pairs of second sections 132, to increase an air flow rate within heat sink 100. Furthermore, the extension of second section 132 in a perpendicular direction to the central axis of heat sink 100 may increase the internal surface area of heat sink 100 without creating a choke point, wherein the choke point could have a smaller diameter than that of the created chimney.

Bend 160 may be positioned between second section 132 and third section 134 of MCPCB sheets 110, 112, and allow third sections 134 to extend in a direction perpendicular to second sections 132. Furthermore, bends 160 may be co-planer with bends 150. In embodiments, the geometry of bends 160 may allow pairs of third sections 134 to extend in parallel to each other. In embodiments, bends 150, 160, and the use of multiple sheets of MCPCB may increase the overall surface area of heat sink 100 for the specified geometric volume, which may allow for heat sink 100 to more efficiently control and dissipate heat.

Third sections 134 of MCPCB sheets 110, 112 may be positioned from bend 160 to the upper surface 136 of heat sink 100. In embodiments, a lateral distance between pairs of third sections 134 may be the smallest lateral axis of heat sink 100. In embodiments, the lateral distance between pairs of third sections 134 may be larger than the lateral distance across second section 132. Furthermore, the height of the third section 134 may be larger than the height of the first second 130. The geometry and positioning of third section 134 may allow for a chimney effect between the pairs of MCPCB sheets 110, 112, extending from an interior of heat sink 100 to an open upper surface 136 of heat sink 100. The chimney effect may utilize an open uppermost surface of heat sink 100, wherein the heated airflow may flow from an internal area within the heat sink through the unsealed upper surface.

Specifically, the entirety of the upper surface 136 of heat sink 100 may be open from the proximal end to the distal end of the heat sink across the entire lateral axis of heat sink 100. In specific embodiments, the chimney effect may initiate at the lower surface of third section 134 and extend to the uppermost surface of third sections 134. Furthermore, third sections 134 may have sufficient height to extend away from the upper surface of second sections 132 to increase the overall surface area of heat sink 100, which is why the opening caused by third sections 134 cannot be co-planar with the upper surface of second sections 132.

End caps 120, 122 may be positioned on a proximal end and a distal end of heat sink 100, respectively. End caps 120, 122 may be configured to support MCPCB sheets 110, 112, and allow heat sink 100 to be a rigid system. In embodiments, end caps 120, 122 may be configured to be coupled to MCPCB sheets 110, 112 via any known means, such as tabs, press fittings, welding, etc. End caps 120, 122 may be substantially triangular or trapezoidal in shape, which may assist in controlling the air flow around heat sink 100. End caps 120, 122 may include at least one lower window 140, and at least one upper window 142.

The at least one lower window 140 may allow air to flow from an outer surface of heat sink 100, into a passageway between MCPCB sheets 110, 112, and out of the open upper surface of heat sink 100 between the pairs of third sections 134. In embodiments, the at least one lower window 140 may be positioned vertically below first bend 150 and second bend 160.

The at least one upper window 142 may be used for mounting the fixture. In embodiments, the at least one upper window 142 may be positioned vertically above the first bend 150 and the second bend 160.

Figure 2:
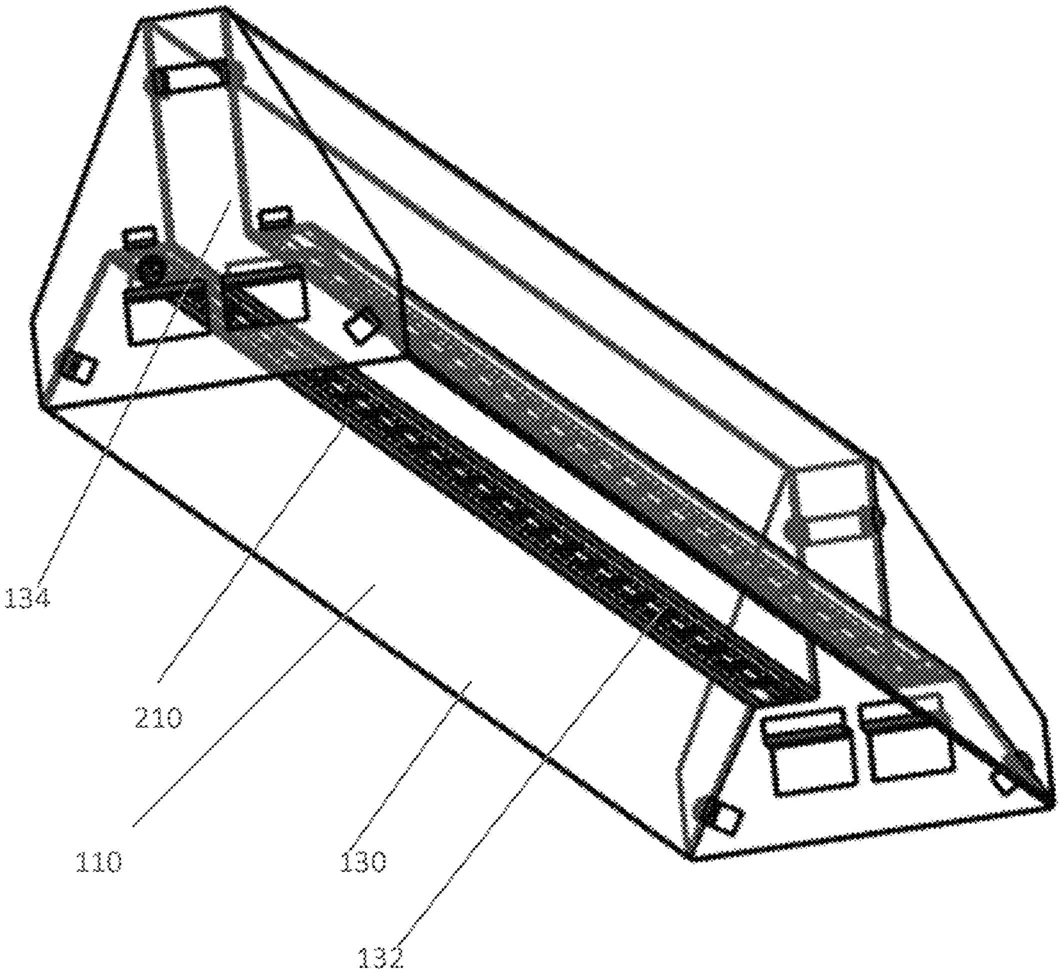
FIG. 2 depicts heat sink system, according to an embodiment.

FIG. 2 depicts heat sink system 100, according to an embodiment. Elements of heat sink system 100 may be described above, and for the sake of brevity, a further description of these elements may be omitted.

As depicted in FIG. 2, light sources 210 may be positioned on an inner, and under, the surface of section portion 132. light sources 210 may be light-emitting diodes (LEDs) or any other device that is configured to emit light. light sources 210 may be directly embedded or positioned on MCPCB sheets 110, 112, such that additional operations to affix tape or thermal adhesives to MCPCB sheets 110, 112, a heat sink, or both are not required. light sources 210 may be positioned from the first end of MCPCB sheets 110, 112 to the second end of MCPCB sheets 110, 112. light sources 210 may be configured to generate heat in response to creating and emitting light. light sources 210 may be arranged on MCPCB sheets 110, 112 in a plurality of rows, or in any predetermined layout to generate a desired light pattern on an area of interest positioned below heat sink 100.

Figure 3:
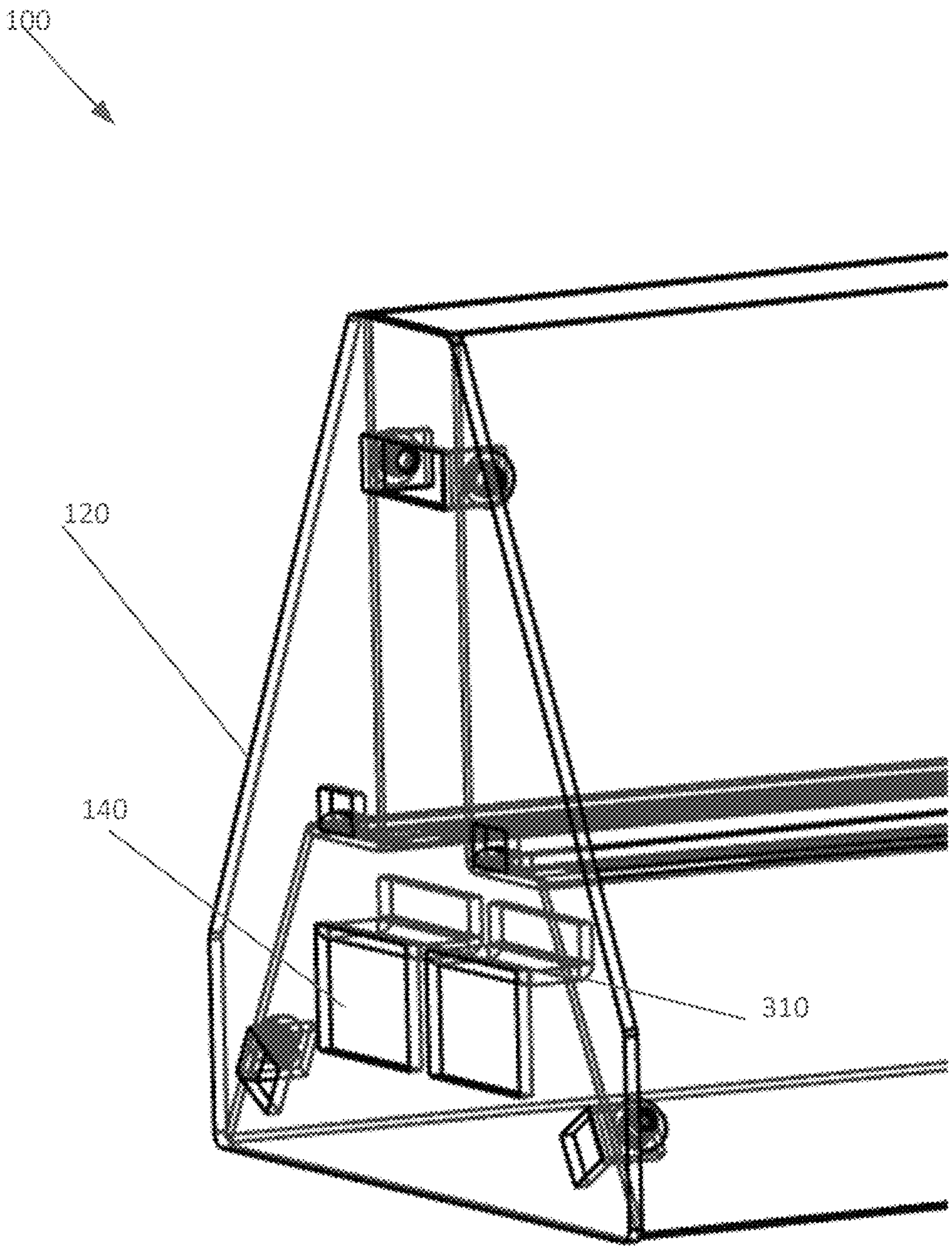
FIG. 3 depicts a heat sink system, according to an embodiment.

FIG. 3 depicts heat sink system 100, according to an embodiment. Elements of heat sink system 100 may be described above, and for the sake of brevity, a further description of these elements may be omitted.

As depicted in FIG. 3, raceway 310 may be positioned within each of the at least one lower windows 140. Raceway 310 may be formed of the material previously occupied within the lower windows 140 or may be affixed to the inner surface of end caps 120, 122. In embodiments, raceway 310 may be formed by bending the sheet of the metal endcaps inward. Raceway 310 may be configured to support wires associated with heatsink 100, and control air flow towards the center of heat sink 310, and upwards out of heat sink 100. Specifically, raceway 310 may have a ledge and projection, wherein the ledge may extend along a central axis of heat sink 100 and the projection may extend upward in a direction perpendicular to the central axis of heat sink 100.

Figure 4:
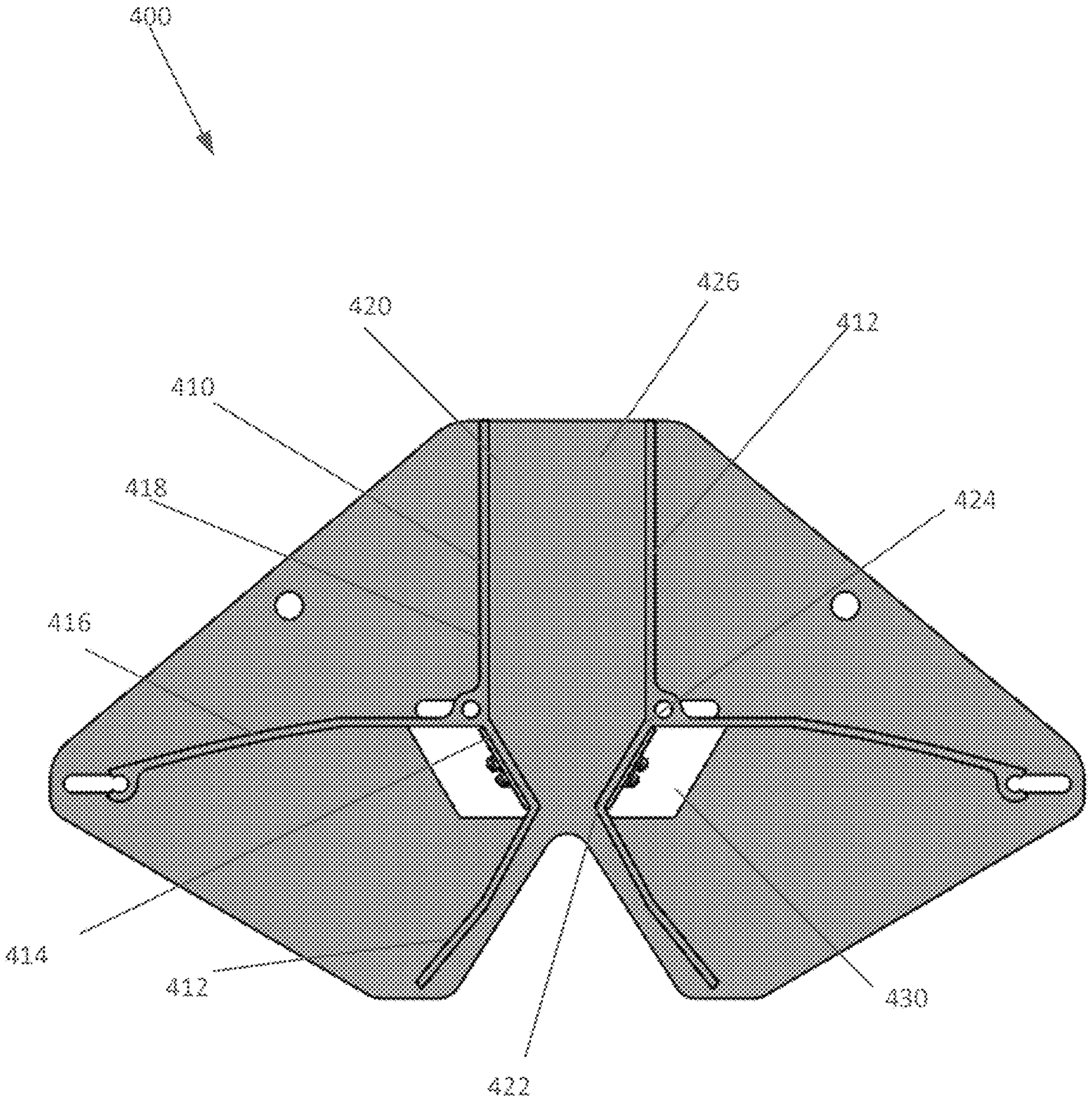
FIG. 4 depicts a heat sink system, according to an embodiment.

FIG. 4 depicts heat sink system 400, according to an embodiment. Elements of heat sink system 400 may be described above, and for the sake of brevity, a further description of these elements may be omitted.

FIG. 4 depicts a heat sink system 400 with an integrated reflector 416. Heat sink system 400 may include a first portion 412, second portion 414, integrated reflector 416, and third portion 416. In embodiments, each of the MCPCB may include a first portion 412, second portion 414, integrated reflector 416, and third portion 416 that are coupled together via endcaps that are formed via extrusion.

First portions 412 may be angled such that a distance across pairs of first portions 412 is longer at a lower surface of first portions 412 than an upper surface of first portions 412. This angularity may force air to flow toward the central axis of the heat sink 400. Furthermore, the outer surface of the first portions 412 may be configured to interact with light emitted from the light sources, which may assist in controlling the light pattern generated by the light sources.

The second portions 414 may be positioned between the first bend 422 and the second bend 424. Second portions 414 may be angled in an opposite direction than the first portions 414, such that the distance across pairs of the second portions 414 is shorter at a lower surface of the second portions 414 than an upper surface of the second portions 414. This may create a choke point for air flowing upwards through heat sink 100. In embodiments, light sources may be positioned on the outer surface of the second portions 414. In embodiments, the width of the second portion 414 may be shorter than that of the first portion 412, integrated reflector 416, and third portion 418.

Windows 430 positioned on endcaps of heat sink 400 may be aligned with second portion 414. This alignment may more easily allow heat generated by the light sources to be removed from heat sink 400.

First angles 422 may be positioned between first portion 412 and second portion 414. First angles 422 may have an angularity that increases a lateral distance across the second portion 414. Furthermore, the first angles 422 may position the light sources at a downward angle toward a floor surface at an angle that is tangential to the floor surface.

Integrated reflector 416 may be an outcrop, protrusion, wing, etc. extending from second angles 424 away from a central axis of heat sink 400. The integrated reflectors 416 may have a light downward curvature, which may assist in controlling a light pattern emitted from the light sources. In embodiments, integrated reflector 416 may have a longer width than the first portions 412.

The third portions 418 of each of the MCPCB sheets may be positioned from angle 424 to the upper surface of heat sink 400. In embodiments, a lateral distance between pairs of third portions 418 may remain constant. In embodiments, the height of third portions 418 may be larger than the height of the first portion 412. The geometry and positioning of third portions 418 may allow for a chimney effect, extending from an interior of heat sink 100 to an open upper surface of heat sink 100.

Second angles 424 may be configured to cause pairs of third portions to extend in parallel to each other or flare outward. Accordingly, the first angle 422 and the second angle 424 may be opposite angles.

Figure 5:
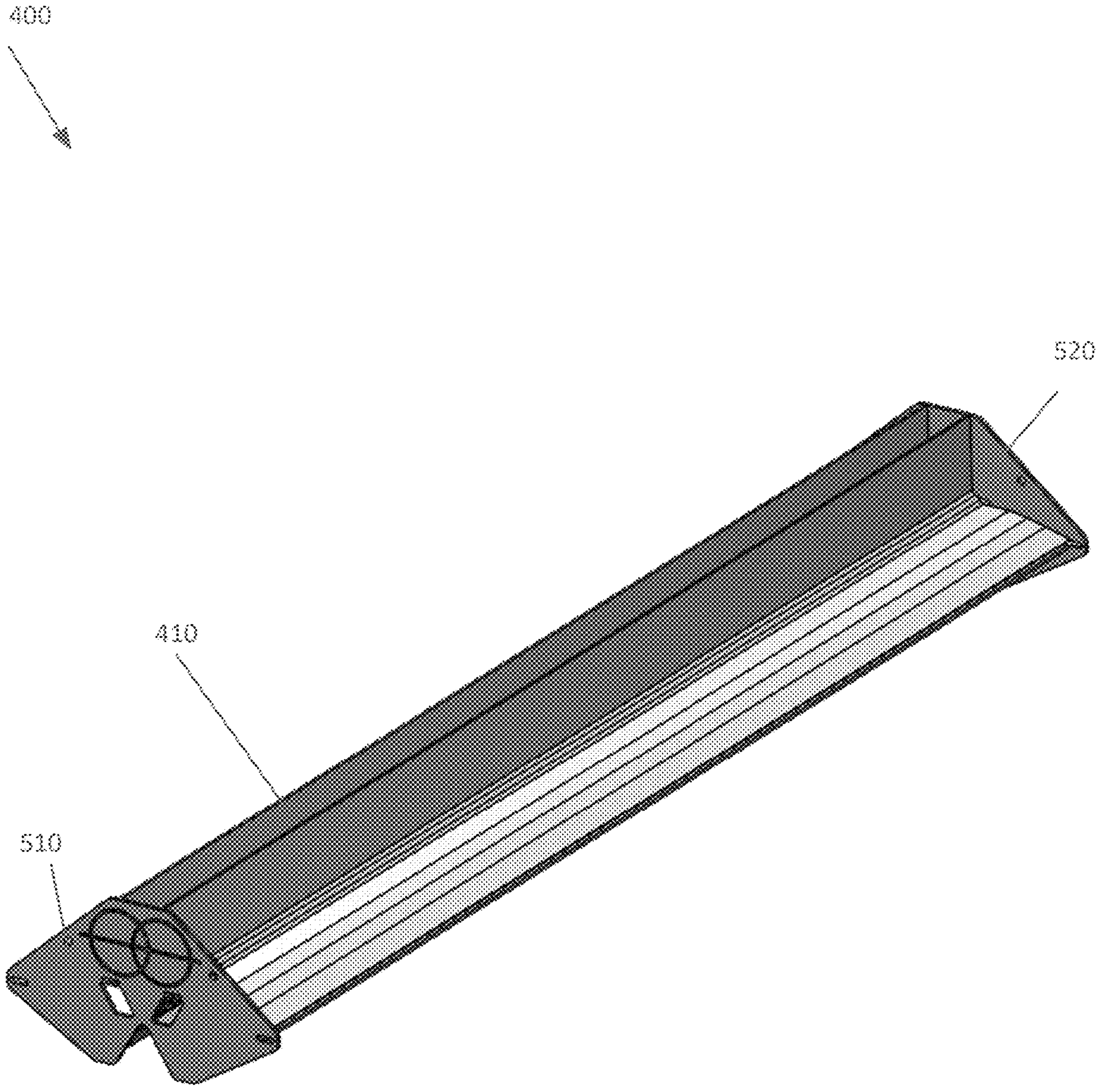
FIG. 5 depicts a heat sink system, according to an embodiment.

FIG. 5 depicts heat sink system 400, according to an embodiment. Elements of heat sink system 400 may be described above, and for the sake of brevity, a further description of these elements may be omitted.

As depicted in FIG. 5, the first end of each of the MCPCB sheets may be coupled to a first endcap 510, and a second end of each of the MCPCB sheets may be coupled to a second endcap 520. The pairs of sheets of MCPCB 410 may form an open-top surface, which may act as a chimney.

Figure 6:
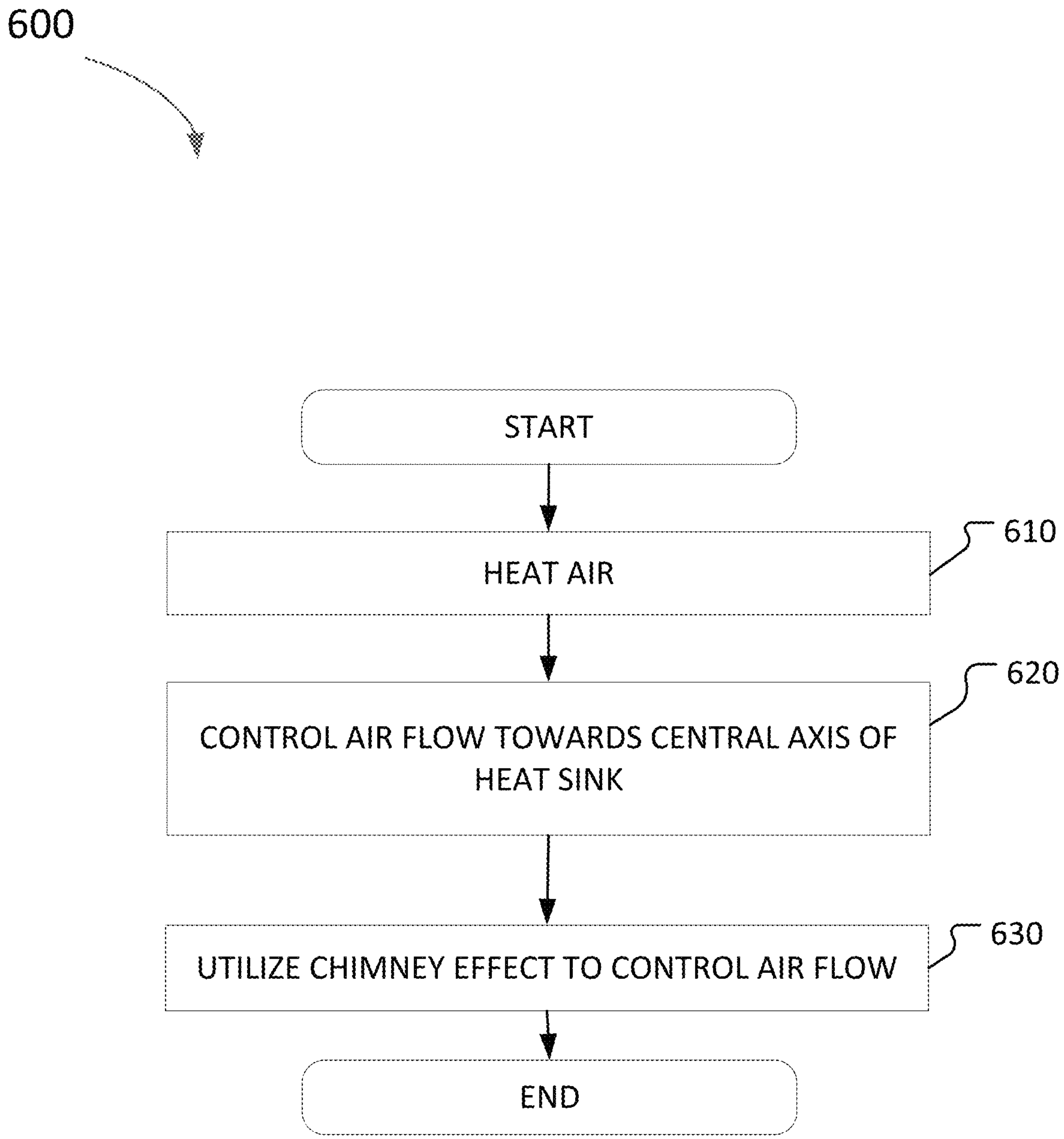
FIG. 6 depicts an operation sequence for managing airflow associated with a light fixture, according to an embodiment.

FIG. 6 depicts an operation sequence 600 for managing airflow associated with a light fixture, according to an embodiment. The operational sequence presented below is intended to be illustrative. In some embodiments, operational sequence may be accomplished with one or more additional operations not described, and/or without one or more of the operations discussed. Additionally, the order in which the operations of the operational sequence are illustrated in FIG. 6 and described below is not intended to be limiting.

At operation 610, a light fixture may generate heat, which heats air. The heat may be generated based on light sources emitting light, electronic components associated with the light fixture, etc. In embodiments, the heat may be generated in an internal compartment within the light fixture, wherein the internal compartment is between a proximal end and a distal end of the light source and between an upper surface and a lower surface of the heat sink.

At operation 620, the air that is heated by the light sources may travel upward along the internal angled sidewalls of the light source towards a central axis of the heat sink, wherein the angled sidewalls gradually and continuously reduce the width across the heat sink.

At operation 630, the heated air may travel upwards through a vertical stack of the light fixture, wherein the vertical stack has a minimum width of the light fixture. In embodiments, the vertical stack may extend from the proximal end to the distal end of the heat sink, and include an open upper surface.

Although the present technology has been described in detail for illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure, or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowcharts and block diagrams in the flow diagrams illustrate the architecture, functionality, and operation of possible implementations of systems, methods, and computer program products according to various embodiments of the present invention.

What is claimed is:

1. An embedded heat sink within a light fixture comprising:

a first sheet formed of metal core board, the first sheet having a first bend in a first direction and a second bend in a second direction, the first direction and the second direction being opposite directions, the first sheet including a first vertical sidewall extending from the second bend;

a light source configured to generate heated air, wherein the light source is positioned between the first bend and the second bend;

a second sheet coupled to the first sheet, the second sheet that mirrors the first sheet over a central axis of the light fixture, the second sheet including a second vertical sidewall;

a vertical stack positioned between the first sheet and the second sheet formed of the first vertical sidewall and the second vertical sidewall, the vertical stack being aligned with the central axis of the light fixture and having an exposed lower surface and an exposed upper surface, wherein the heated air generated from the light source flows from the exposed lower surface to the exposed upper surface of the vertical stack.

2. The light fixture of claim 1, wherein the first bend is less than 90 degrees.

3. The light fixture of claim 1, wherein the first sheet includes a first portion, a second portion and a third portion, wherein the second portion has a smaller width than the first portion, thereby decreasing the width of the light fixture, wherein the third portion of the light fixture is perpendicular to the second portion of the light fixture, the first portion being configured to direct the heated air generated from the light source towards the vertical stack, the second portion being positioned between the first bend and the second bend.

4. The light fixture of claim 1, wherein the first bend causes a plane of a first portion to be less than 90 degrees apart from a plane of the second portion.

5. The light fixture of claim 1, wherein the vertical stack has a uniform width from the exposed lower surface to the exposed upper surface.

6. The light fixture of claim 1, wherein the lower surface of the heatsink is entirely exposed.

7. The light fixture of claim 1, further comprising:

an end cap positioned on the proximal end of the first sheet and the second sheet, the end cap having at least one window, wherein the at least one window is positioned below the second portion.

8. The light fixture of claim 7, further comprising:

a raceway within the at least one window, the raceway having a ledge and a projection, the ledge extending along a central axis of the heatsink and the projection extending upward in a direction perpendicular to the central axis of the heatsink.

* * * * *